United States Patent [19]

Bernard

[11] Patent Number: 5,245,423
[45] Date of Patent: Sep. 14, 1993

[54] MOVEMENT ESTIMATION METHOD AND SYSTEM FOR HIGH DEFINITION DIGITAL TELEVISION FRAMES

[75] Inventor: Philippe Bernard, Cesson Sevigne, France

[73] Assignees: Centre National d'Etudes des Telecommunications; Telediffusion de France, France

[21] Appl. No.: 672,166

[22] Filed: Mar. 19, 1991

[30] Foreign Application Priority Data

Mar. 20, 1990 [FR] France ................................ 90 03549

[51] Int. Cl.$^5$ .............................................. H04N 7/12
[52] U.S. Cl. .................................... 358/105; 358/138
[58] Field of Search .............................. 358/138, 105

[56] References Cited

U.S. PATENT DOCUMENTS

| | | | |
|---|---|---|---|
| 4,575,756 | 5/1986 | Furukawa | 358/136 |
| 4,777,530 | 10/1988 | Kondo | 358/160 |
| 4,965,667 | 10/1990 | Trew et al. | 358/138 |
| 5,031,039 | 7/1991 | Haghiri et al. | 358/138 |
| 5,036,392 | 7/1991 | Janssen | 358/138 |
| 5,068,727 | 11/1991 | Haghiri et al. | 358/138 |
| 5,072,292 | 12/1991 | Van Overmeire | 358/138 |

FOREIGN PATENT DOCUMENTS 0294956 12/1988 European Pat. Off. .
0342756 11/1989 European Pat. Off. .
0347984 12/1989 European Pat. Off. .
2628864 9/1989 France .

OTHER PUBLICATIONS

*BBC Research Department Report*, No. 11, Sep. 1987, Tadworth GB pp. 1-20, G. A. Thomas et al, "Television Motion Measurement for DATV and Other Applications".

*Primary Examiner*—Alvin E. Oberley
*Assistant Examiner*—Minsun Oh
*Attorney, Agent, or Firm*—Larson and Taylor

[57] ABSTRACT

A movement estimation method and system are disclosed for high definition digital television frames. The movement is estimated for a current block Bc of the even fields $T_{2k}$, 2r-1 of the uneven frames with which n movement vectors are associated, with the current block Bc of the even fields $T_{2k}$, 2r of the even frames there is associated, by relative addressing, a movement vector with respect to s vectors of the preceding frame $I_{2r-1}$ surrounding the frame B'c of the current block Bc. The s vectors are chosen by eliminating the vector redundancies among the n vectors. The invention is applicable to broadcasting and transmission of digital television signals by HD-MAC or HD-MAC NB narrow band channel.

8 Claims, 3 Drawing Sheets

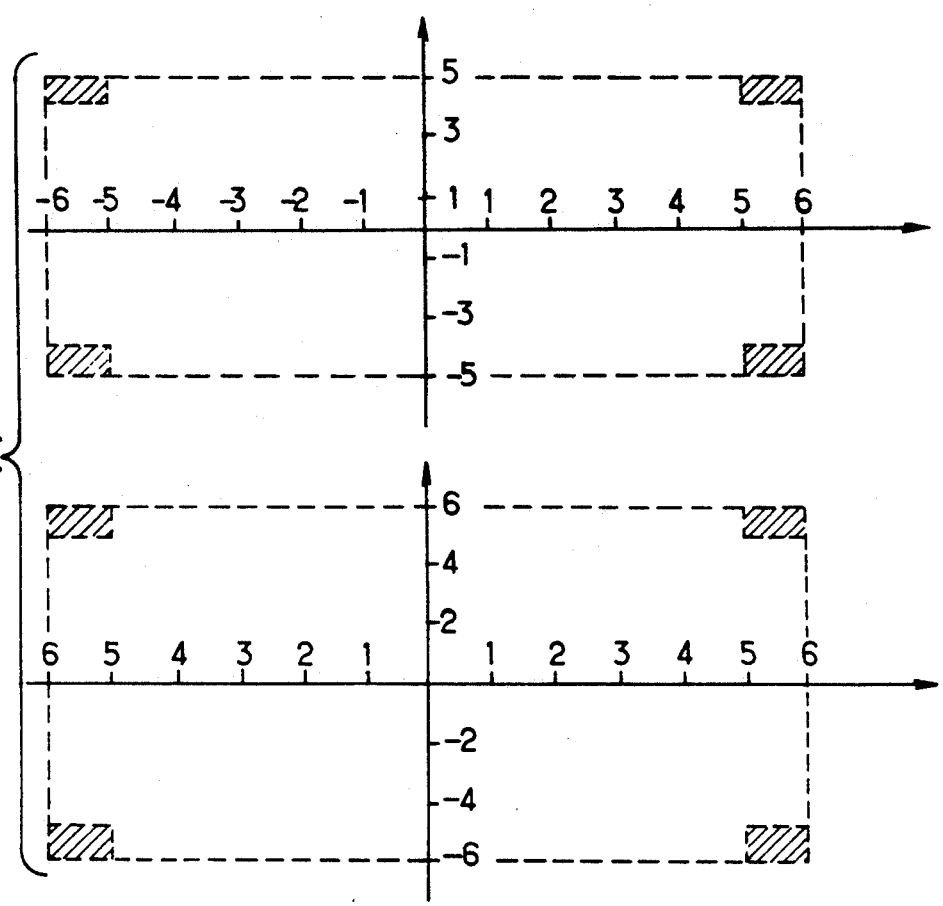
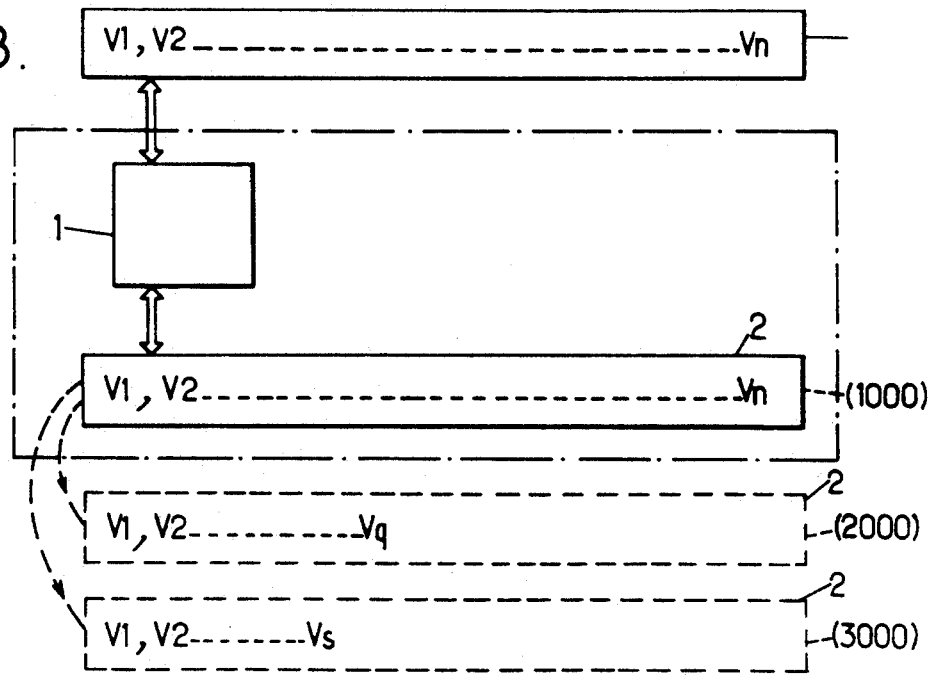

MOVEMENT ESTIMATION METHOD AND SYSTEM FOR HIGH DEFINITION DIGITAL TELEVISION FRAMES

The invention relates to a movement estimation method and system for high definition digital television frames.

At the present time, the broadcasting and transmission of high definition digital television frames are being studied within the scope of the EUREKA 95 project in which the purpose of the different partners is to establish standards for the broadcasting and transmission of such frames so as to keep a maximum of compatibility with respect to existing equipment or equipment to be brought into service in the near future such as satellite broadcasting and transmission of D MAC or D2 MAC type.

During satellite broadcasting and transmission of high definition digital television frame signals, according to the HD-MAC protocol, time multiplexing of the luminance and chrominance component data and of the sound data is carried out over a transmission field. Apart from the above data, the multiplex also comprises assistance data DATV (digitally assisted TV), whose purpose is to transmit the information relative to the activity, or movement, in each frame from the HD-MAC encoder to the HD-MAC decoder. This assistance data is transmitted by the HD-MAC channel during the intervals of vertical suppression of the HD-MAC multiplex, with a maximum bit rate of 1 Mbit/sec and corresponding to a sampling frequency of 20.25 MHz. (c.f. FIG. 1a.)

More recently, and so as to provide better compatibility not only with the new standards proposed for broadcasting and transmission of high definition digital television frames but also with existing equipment a new transmission standard has been proposed, i.e. for the broadcasting and transmission of high definition digital television frames of HD-MAC narrow band type and designated hereafter by HD-MAC NB. The narrow band transmission standard is characterized by a sampling frequency at transmission which is reduced from 13.5 MHz to 9 MHz, in a luminance base band namely in a ratio of ⅔, by horizontal compression of the frame lines obtained by decimation. Broadcasting to said standard, apart from the previously mentioned compatibility, allows useful frames to be obtained, after decoding, close to the high definition quality at the cost of an acceptable definition degradation.

For a more complete description of this type of HD-MAC narrow band broadcasting standard, reference may be made to the French patent application entitled "Procèdè et dispositif de codage-décodage d'un signal numérique de télévision haute définition en bande étroite" filed on the same day as the present application in the name of the Applicant, under the application number 90 03548.

Furthermore, the use of the HD-MAC NB standard at reception, i.e. at the level of the HD-MAC decoder restoring the BRD band by band compression by sampling, the transmitted television digital signal being thus brought to a signal corresponding to a luminance base band frequency of 9 MHz, has been described in the French patent application 89 16860 filed on Dec. 15, 1989 in the name of the Applicant.

The use of a HD-MAC Nb type standard, because of the reduction of the band width of the useful signal, in the base band, in the ratio of the sampling frequencies necessarily involves a corresponding reduction of the bit rate of the assistance data DATV.

Thus, for transmission of the assistance data DATV with a sampling frequency reduced to ⅔, i.e. to a frequency of 13.5 MHz instead of 20.25 MHz, the transmission of the assistance data makes it possible at most to convey, over 20 field suppression lines per frame field, the equivalent of 714 points per frame line over 40 field suppression lines, at the rate of 25 MAC transmission fields per second, i.e. 714 kbits/sec.

It is consequently necessary to reduce to such a value the transmission rate of the assistance data DATV and of course, the amount of information relative to the movement, per unit of time, so as to make possible corresponding switching of the sampling channels 20 ms, 40 ms and 80 ms at the level of HD-MAC band restoring decoder BRD.

In order to better define the purpose of such a reduction, the principles of estimating movement in an HD-MAC type system will be described in connection with FIGS. 1a and 1b.

In FIG. 1a, a band reducing encoding and band restoring decoding assembly has been shown forming an HD-MAC type channel. Space-time filtering of the HD digital signal, at the level of the BRE, with a time constant of 80 ms for the fixed zones of the frame, 20 ms for the mobile zones and 40 ms for the intermediate zones is effected on switching from a criterion of measurement of activity of each frame, the criterion of activity of the current frame and a block movement vector, for a current block of this frame, being encoded in the form of TV assistance data and transmitted by the HD-MAC channel to the BRD decoder.

On decoding the assistance data, a corresponding space-time filtering, at the level of the BRD, is carried out by output switching of the 80 ms, 20 ms and 40 ms filters.

In order to be able to estimate movement, the present technique consists, over a periodic duration of 80 ms, in defining the different situation successions of following activities, over two successive frames, uneven frame $I_{2r-1}$, even frame $I_{2r}$.

| Frame $I_{2r-1}$ | Frame $I_{2r}$ |
|---|---|
| 80 ms | 80 ms |
| 40 ms | 40 ms |
| 40 ms | 40 ms |
| 20 ms | 20 ms |
| 20 ms | 20 ms |

When the effective space-time filtering mode, on switching, corresponds to a time constant of 40 ms, the associated movement vector is transmitted. In the 40 ms filtering channel, the samples representative of the even frame $T_{2k}$, 2r or $T_{2k-2}$, 2r−1 movement vectors of the even $I_{2r}$ or uneven $I_{2r-1}$ frames are transmitted, knowing that the even field $T_{2k}$,2r is calculated by movement compensation from the two closely related adjacent uneven field $T_{2k-1}$, 2r−1 and $T_{2k+1}$, 2r where the index r designates the frame indices and the index k the field indices. The estimation of movement is then broken down into two phases, one for the even fields of the uneven frames $T_{2k-2}$, 2r−1 and the other for the even fields of the even frames $T_{2k}$, 2r. A set of 169 possible movement vectors for a current block Bc formed of 16×16 pixels is then chosen, by x, y shifts of this block of 13×13 steps, between ±6, over the de-interlaced frame for the even field and uneven frame $T_{2k-2}, 2r-1$. According to a block matching method, the minimum mean position quadratic error makes it possible for example to define the movement vector for the block Bc considered.

On the other hand, the movement vector of the current block Bc of the even field of the even frame $T_{2k}, 2r$ is obtained by relative addressing with respect to the nine blocks of the preceding uneven frame $T_{2k-2}, 2r-1$ surrounding the current block Bc and defining nine vectors, a block matching technique being applied to these nine vectors. These nine vectors are for example defined by the relative addressing values V1 corresponding to the block and V2 to V9 for example to the current block Bc. As is shown in FIG. 1b, at time 2r when the even field $T_{2k}, 2r$ of the frame $I_{2r}$ occurs, the current block Bc has migrated for example to an adjacent position corresponding to V6 with respect to the prior position at time $2k-2, 2r-1$ of the even field of the uneven frame $I_{2r-1}$, this position corresponding to the frame B'c of the current block Bc on this prior frame.

For a complete frame, formed of an even field and an uneven field, the number of possible movement vector cases for a current block Bc is written:

| Frame 2r − 1 | Frame 2r | |
|---|---|---|
| 80 ms | 80 ms | 1 × 1 |
| 40 ms | 40 ms | 169 × 9 |
| 40 ms | 20 ms | 169 × 1 |
| 20 ms | 40 ms | 1 × 8 |
| 20 ms | 20 ms | 1 × 1 | i.e. 1700 movement vector possibilities, which may be encoded over 11 bits.

The total bit rate for an frame comprising 90 blocks per frame line at the rate of 72 blocks per frame height at an frame frequency of 12.5 Hz with filtering at 80 ms, over 11 bit encoding is then equal to 891 kbits, which, taking into account protections against encoding errors, requires a bit rate of 1 Mbits/sec.

To bring the bit rate of the assistance data DATV from 1 Mbits/sec to 0.7 Mbits/sec, so as to ensure broadcasting and transmission of the narrow band high definition digital television signal HD-MAC NB, the number of 16×16 pixels forming the decision block may be conserved in the context of the patent application entitled "Procèdè et dispositif de codage-décodage d'un signal numérique de télévision haute définition en bande étroite". Although the encoded date bit rate for each transmission field is thus reduced, in proportion since only the assistance data information of the useful part centred by the frame are transmitted, such a solution is not entirely satisfactory for, at reception, at the level of the band restoring decoder BRD, it is necessary to keep a certain horizontal size after band reconstruction, following decompression by horizontal extension in a 3/2 ratio, the final conversion in the ratio of the 36 MHz T 54 MHz sampling frequencies, this solution brings the size of the blocks visually observed during restoration to the equivalent of 24 horizontal pixels by 16 vertical lines at a frequency of 54 Mhz.

An object of the present invention is consequently to provide a movement estimation method and system for digital television frames for reducing the bit rate of assistance data DATV, without modifying the horizontal or vertical dimensions of the decision blocks, after horizontal extension in the 3/2 ratio: for example blocks formed of 12 horizontal by 16 vertical in the context of the above mentioned patent application "Procèdè et dispositif de codage-décodage d'un signal numérique de télévision haute définition en bande étroite".

Another object of the invention is also to provide a movement estimation method and system for digital television frames which, although making possible the reduction of the data rate for broadcasting and transmission of assistance data DATV, nevertheless allows compatibility to be kept with respect to HD-MAC type broadcasting and transmission channels, the movement estimation method and system for digital television frames, according to the invention, thus finding an application either within the framework of HD-MAC type channels, or within the framework of HD-MAC NB type channels with narrow band broadcasting-transmission.

The movement estimation method for high definition digital television frames subjected to HD-MAC type space-time sub-sampling processing, forming the object of the present invention, this movement being estimated for the even field of each frame formed of an even field and an uneven field, from the estimation of movement of the previous and subsequent adjacent uneven fields, N movement vectors being associated with the current block Bc of the even fields $T_{2k-2}, 2r-1$ of the uneven frames $I_{2r-1}$ and a movement vector being associated with the current block Bc of the even fields $T_{2k}, 2r$ of the even frames $I_{2r}$, which vector is obtained with respect to n vectors of the preceding frame $I_{2r-1}$ defined by the blocks adjacent the current block considered, is remarkable in that such relative addressing is effected with respect to s vectors, s<n, of the preceding frame $I_{2r-1}$ surrounding the frame of the current block Bc considered. The s vectors are chosen by eliminating the vector redundancies among the n vectors.

The movement estimation system for high definition digital television frames subjected to HD-MAC type space-time sub-sampling processing, forming the object of the present invention, this movement being estimated for the even field of each frame formed of an even field and an uneven field, from the estimation of movement of the previous and subsequent adjacent uneven fields, N movement vectors being associated with the current block Bc of the even fields $T_{2k-2}, 2r-1$ of the uneven frames $I_{2r-1}$ and a movement vector being associated with the current block Bc of the even fields $T_{2k}, 2r$ of the even frames $I_{2r}$, which vector is obtained with respect to n vectors of the preceding frame $I_{2r-1}$ defined by the blocks adjacent the current block Bc considered, is remarkable in that it comprises means for classifying said n vectors, said classification consisting in arranging said n vectors in a given sequence, and means for sorting said sequenced vectors so as to suppress among said n vectors any redundant vector of order p, with p less than n, with respect to the sub-assembly of said previous p−1 vectors, so as to provide a set of non redundant vectors. Means for selecting the s first vectors among the set of non redundant vectors are provided for establishing a reference base from which relative addressing of the current block Bc of the even field $T_{2k}, 2r$ of the even frame $I_{2r}$ is carried out.

A more detailed description of the method and system of the present invention will be given below in the description and the drawings in which, apart from figures 1a and 1b which are relative to the prior art, FIG. 2a shows a diagram illustrating the use of the method according to the invention;

FIG. 3 shows a functional diagram relative to a movement estimation system for high definition digital television frames according to the invention.

A more detailed description of the movement estimation method for high definition digital television frames, according to the invention, will now be given with reference to FIGS. 1b, 2a and 2b.

Figure 1A:
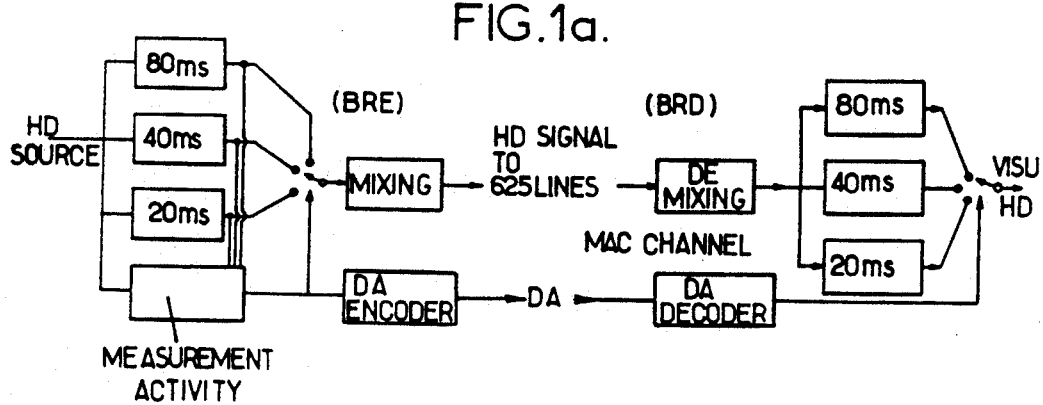
Figure 1B:
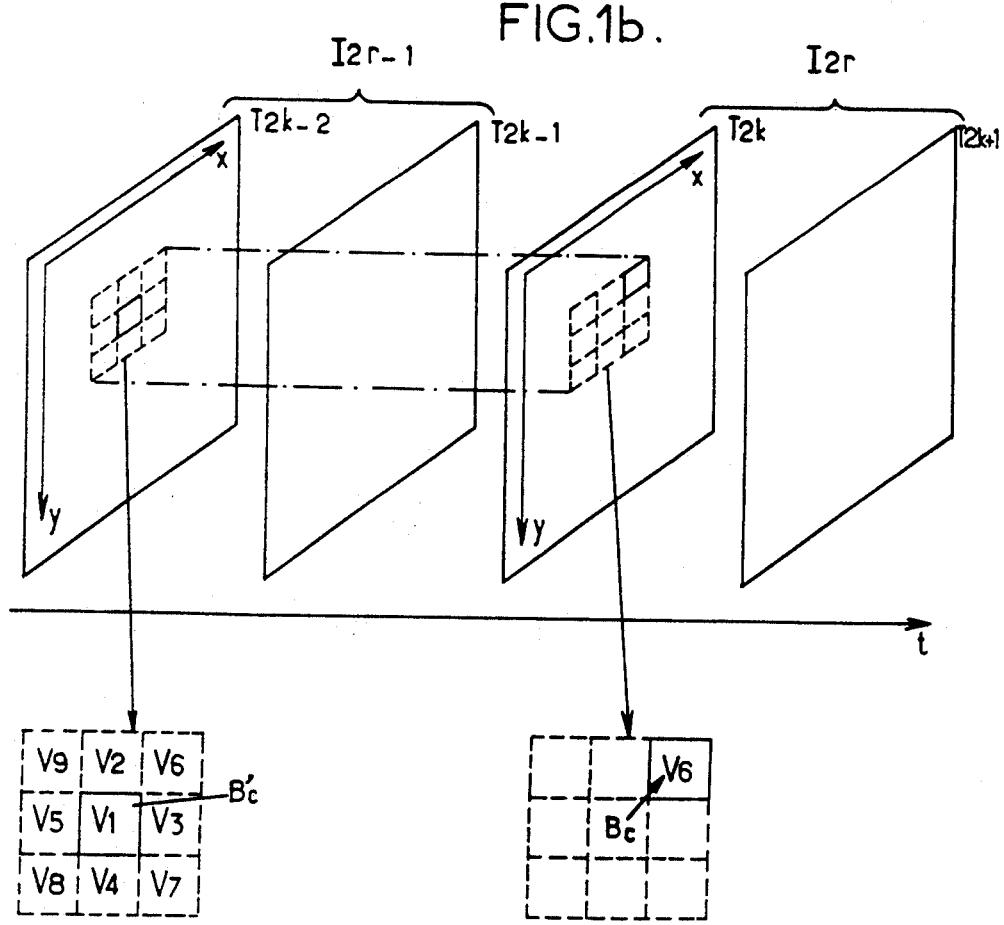

Thus, as shown in FIG. 1b, the movement estimation method, according to the invention, for high definition digital television frames uses a block matching process for the even field of each image formed of an even field and an uneven field, from the movement estimation of the previous and subsequent adjacent uneven fields, the fields $T_{2k}$, 2r and $T_{2k-2}$, 2r−1, shown in FIG. 1, the current block being referenced Bc.

From the estimation of movement from the previous and subsequent adjacent uneven fields $T_{2k-1}$, 2r−1 and $T_{2k+1}$, 2r, n movement vectors are associated with the current block Bc of the even fields $T_{2k}$, 2r−1 of the uneven frames $I_{2r-1}$, the number N being equal to 169 in accordance with the prior art.

With the current block Bc of the even frames $T_{2k}$, 2r of the even frames $I_{2r}$ is associated, by relative addressing, a movement vector obtained with respect to n vectors of the preceding frame referenced $I_{2r-1}$. It will be noted that the n vectors of the preceding frame are for example defined by the blocks adjacent the image of the current block Bc considered on this frame, this block of pixels being recognizable by the value of the luminance and chrominance components for example which are assigned to each of them.

According to an advantageous characteristic of the method according to the invention, said relative addressing is effected with respect to s vectors, s being less than n, of the preceding frame referenced $I_{2r-1}$. These n vectors surround the frame B'c of the current block Bc and correspond to preferential positions of movement of said current block Bc.

According to an advantageous characteristic of the method according to the invention, the s vectors are chosen by eliminating the movement vector redundancies among said n vectors.

According to an advantageous non limitative characteristic of the method of the invention, the number s of vectors of the preceding frame $I_{2r-1}$ is equal to 5, s=5.

Figure 2A:
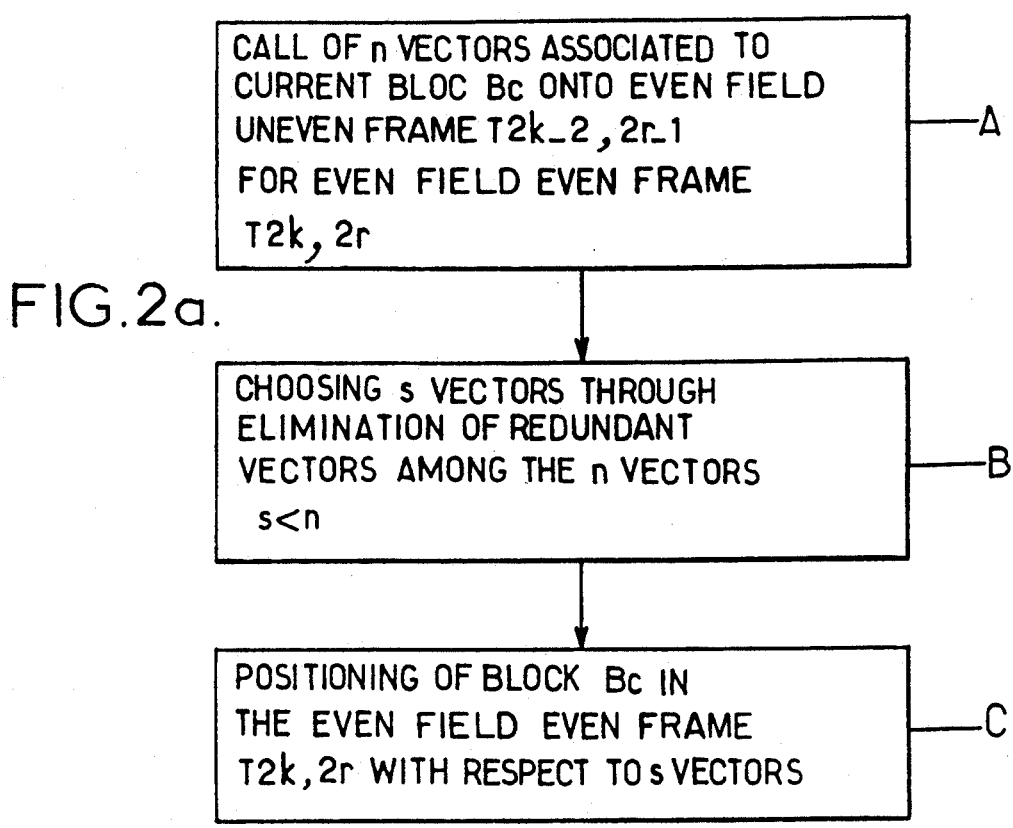
FIG. 2b shows a diagram illustrating a first detail of implementing the method according to the invention.
FIG. 2c shows a diagram illustrating a second detail of implementation of the method according to the invention.

Thus, as is shown in the functional diagram of FIG. 2a, the method of the invention comprises the following essential steps.

Step A consisting in calling up the n vectors associated with the current block Bc on the even field of the uneven frame referenced $T_{2k-2}$, 2r−1 for the even field of the even frame $T_{2k}$, 2r, it will be readily understood that said step A for the previously mentioned current block Bc thus consists of the n vectors mentioned, these vectors corresponding for example to the position of block Bc considered for vector V1 as is shown in FIG. 1b and to vectors V2 to V9 corresponding to positions adjacent the block Bc considered in fact form a first reduced reference base for positioning the current block Bc in the even field of the subsequent even frame $T_{2k}$, 2r with respect to which the position of the mobile current block Bc will be expressed.

The method of the present invention then comprises step B such as shown in FIG. 2a, whose purpose is to choose s vectors from the previously defined n vectors, this choice being made by eliminating the redundant vectors among said n vectors.

It will of course be understood that the preceding measure, while reducing the quantity and so the bit rate to be coded, allows the dimensions of the decision blocks such as block Bc to be kept.

Said step B is then followed, for the even field of the even frame $T_{2k}$, 2r to be provided, after recognition of the block Bc considered by comparison of the luminance and chrominance values attributed to the pixels forming the latter, by locating the position of this current block Bc in the second reference field formed by the s vectors in which the redundant vectors have been suppressed.

A more detailed description of the above essential steps and in particular of implementation thereof will be given in connection with FIG. 2b, which describes the successive procedures used for conducting steps A, B and C described previously in FIG. 2a.

Thus, the above step A may be put into practice using a procedure of storing n vectors referenced V1, Vp, Vn in a work memory, classification of the n vectors of the frame $I_{2r-1}$ being carried out so as to arrange these n vectors in a given sequence so as to obtain a set of sequentially arranged vectors.

Then step B may be implemented by means of a procedure for sorting the set of sequentially arranged vectors by suppressing any redundant vector of order p, for p<n, with respect to the sub-set of p−1 previous vectors so as to obtain a set of non redundant vectors.

Step C may then be carried out using a procedure for selecting the s first sequentially arranged vectors, which procedure is referenced 3000, so as to obtain the second base or reference frame from which relative addressing of the current block Bc of the even field $T_{2k}$, 2r of the even frame $I_{2r}$ will then be effected. In FIG. 2b, the reference field R is shown as formed of the set of the s vectors.

Figure 2B:
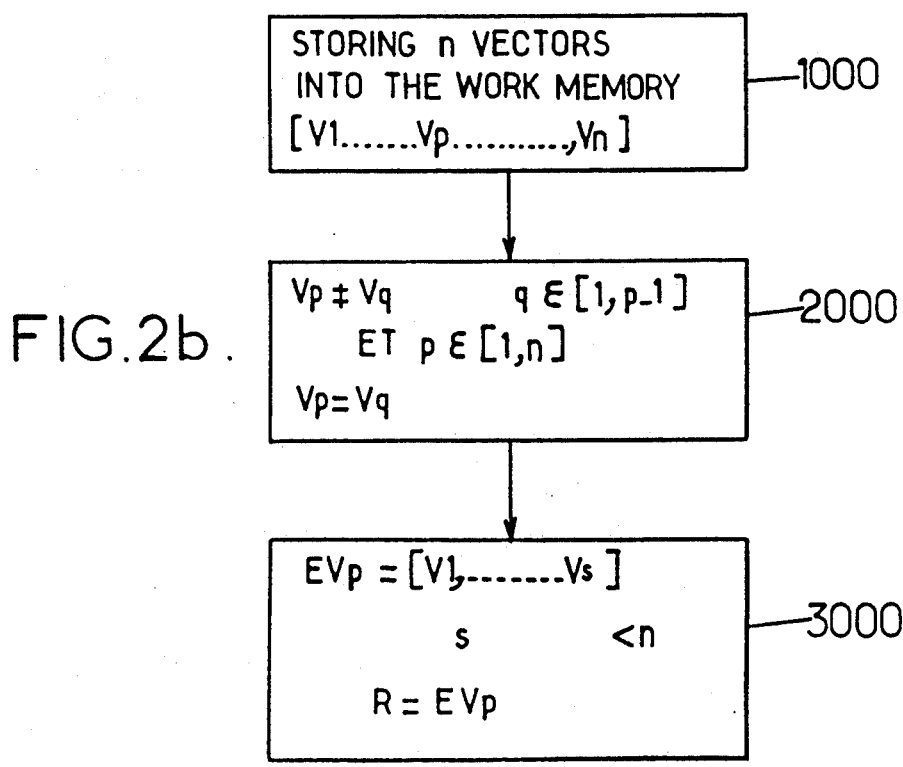

In so far as the procedure referenced 1000 is concerned, such as shown in FIG. 2b, it will be noted that the order of storing the vectors and finally the classification of said n vectors is preferably chosen so as to store successively the movement vector V1 of the frame B'c of the current block Bc in the uneven frame $I_{2r-1}$ on the even field $T_{2k-2}$, then successively the movement vectors corresponding to the most probable spatial positions, i.e. the vectors V2, V3, V4, V5 then V6, V7, V8, V9 corresponding respectively on the one hand to the lateral, vertical, horizontal, vertical, horizontal positions with respect to the frame B'c of the current block then the diagonal positions V6, V7, V8, V9, these diagonal positions being theoretically less probable.

In so far as the sorting procedure is concerned, such as shown in step 2000, it may be achieved in accordance with the law indicated by then suppressing any redundant vector of order p with p<n with respect to the sub-sets of the p−1 previous vectors so as to obtain a set of non redundant vectors.

Finally, the selection of the s first vectors, with the redundant vectors suppressed, is then carried out using the procedure at 3000 so as to obtain the second reference base from which the relative addressing of the current block Bc of the even field $T_{2k}$, 2r of the even frame $I_{2r}$ is effected.

According to another particularly advantageous aspect of the method of the invention, as will be described in relation to FIG. 2c, the movement vectors of each uneven frame $I_{2r-1}$ are quantized in the horizontal and vertical directions with respect to a two-dimensional grid over the whole of the dimension of the frame, horizontal dimension and vertical dimension, this quantization grid preferably having a horizontal quantization step ph=1 and a vertical quantization step pv=2. Advantageously, the movement vectors of the angles of the frame are excluded.

As is shown in FIG. 2c, the vertical quantization step pv=2 is chosen for quantization threshold values on the essentially uneven vertical dimension. In this case, the values chosen, as is shown in said figure, comprise the values:

−5; −3; −1; 0; 1; 3; 5

According to another embodiment shown in FIG. 2c, the vertical quantization step equal to 2 is chosen from quantization threshold values of even value. In this second case, the quantization threshold values are equal to:

−6; −4; −2; 0; 2; 4; 6

It will be noted that the first solution of the quantization threshold values of the movement vectors in which the quantization values are uneven is more advantageous than the second, for it reduces the material complexity of the band reducing encoder and of the band restoring decoder to the extent that it is no longer necessary to de-interlace the high definition source frame so as to obtain two progressive frames at times T−1 and T+1 on each side of the current block, apart from calculation of the central line.

A description of a non limitative embodiment of a movement estimation system for high definition digital television frames in accordance with the present invention will now be given in connection with FIG. 3.

Of course, the movement estimation system of the present invention is intended to be used at the level of a band reducing encoder BRE of an HD-MAC channel or of an HD-MAC NB type narrow band broadcasting and transmission channel. For this, the system of the invention, in the embodiment such as shown in FIG. 3, advantageously comprises the elements contained in the area defined by the broken line rectangle.

Consequently, it is considered that the movement for the current block Bc is estimated for the even field of each frame formed of an even field and an uneven field, from the estimation of movement of the previous and subsequent adjacent fields, N movement vectors $T_{2k-2}$, 2r−1 of the uneven images $I_{2r-1}$ and a movement vector obtained from the n vectors of the preceding frame $I_{2r-1}$ being associated with the current block Bc of the even fields $T_{2k}$, 2r of the even frames $I_{2r}$.

Thus, the band reducing encoder conventionally comprises a storage unit referenced A which, properly speaking, does not form part of the movement estimation system of the invention.

According to the embodiment of FIG. 3, the system of the invention comprises a high speed computer 1 and a storage circuit 2 for sequentially storing the set of vectors calculated in accordance with the procedure of the invention, such as shown for example in FIG. 2b.

It will thus be understood that the high-speed computer 1 with which for example a program for storing the n vectors is associated for carrying out the procedure 1000 shown in FIG. 2b, thus forms a means of classifying these n vectors according to the criterion mentioned above in the description so as to obtain the set of n sequentially arranged vectors.

It will then be understood that the storage unit 2, which may have a storage capacity similar to the storage unit A contained in the existing system of the band reducing encoder BRE, operates then as a work memory of RAM type. Storage of the sequentially arranged vectors is thus ensured as shown in FIG. 3.

It will be further understood that the same high-speed computer 1 associated with a computing program for sorting the criteria indicated relatively to the procedure shown at 2000 in FIG. 2b forms a method of sorting the sequentially arranged vectors so as to suppress among them any vector of order p, for p<n, with respect to the subset of the previous p−1 vectors so as to obtain the set of non redundant vectors. In FIG. 3, there has been shown with broken lines, outside the rectangular chain-dotted perimeter, the state of the storage unit 2 in which, following implementation of the sorting procedure according to the procedure 2000 shown in FIG. 2b, the set of non redundant vectors has been stored.

It will finally be understood that the high-speed computing circuit 1 associated with a procedure for selecting the s first sequentially arranged non redundant vectors obtained following the procedure 2000 forms the second reference base from which the relative addressing of the current block Bc of the even field $T_{2k}$, 2r of the even frame $I_{2r}$ is effected.

In FIG. 3, there has also been shown with broken lines the storage state of the second reference base formed by the s non redundant vectors, these vectors then being stored in the storage unit 2.

Of course, the high-speed computing circuit 1 then makes it possible to clear the storage unit A of the band reducing encoder BRE and to write in this storage unit the second reference base with respect to which the relative addressing will thus be carried out from the second reduced reference base.

It will be readily understood that in so far as the procedures for carrying out the processes shown in steps 1000, 2000 and 3000 in FIG. 2b are concerned, they may consist of corresponding programs written for example in procedural language and normally stored in an ROM, the content of the ROMs being loaded into the work memory formed by the storage unit 2 for example, so as to speed up the processing rate.

It will also be understood that the high-speed computing circuit 1 may be advantageously formed by the computing circuit already present at the level of the band reducing encoder BRE, only a software adaptation being required.

Thus, a movement estimation method and device have been described which are particularly advantageous to the extent that the bit rate of the transmission of assistance data DATV between the reducing encoder and the band restoring decoder of an HD-MAC or HD-MAC NB type channel for narrow band transmission and broadcasting may thus be reduced in the above mentioned ratio. It will in particular be noted that the relative addressing procedure used with respect to a reduced number of vectors is based substantially on a block matching type computation (simple) and consequently that complies with the specifications defined by the HD-MAC or narrow band HD-MAC NB type channels.

I claim:

1. A movement estimation method for high definition successive digital television frames, said successive frames being designated as preceding uneven frames and subsequent even frames and being subjected to HD-MAC type space-time subsampling processing, said successive frames each being formed of an even and an uneven field made of pixels blocks and movement being estimated for the even field of a current frame from an estimation of movement of previous and subsequent adjacent uneven fields, N movement vectors being associated with the current pixels block of the even field of said preceding uneven frame and a further movement vector being associated with a current pixels block of the even field of said subsequent even frame by relative addressing, said further movement vector being obtained with respect to n particular movement vectors of said preceding uneven frame defined by the pixels blocks adjacent said current pixels block, wherein said relative addressing is effected with respect to s specific movement vectors, of said particular movement vectors, where s is a number less than n, of said preceding uneven frame, said specific vectors surrounding the frame of said current pixels block, said s specific vectors being chosen by eliminating the vector redundancies among said n particular movement vectors, said method comprising:

classifying said n particular movement vectors of said preceding uneven frame so as to arrange said particular movement vectors in a given sequence and thereby establish a set of sequentially arranged vectors;

sorting among said set of sequentially arranged vectors by suppressing any redundant particular movement vector of order p, wherein p is a number less than n, with respect to the subset of the p-1 previous vectors so as to establish a set of non-redundant particular movement vectors; and selecting the first s non-redundant particular movement vectors as said s specific movement vectors so as to establish a second reference base from which relative addressing of the current pixels block of the even field of said subsequent even frame is effected.

2. A method according to claim 1, wherein the number s of said particular movement vectors is equal to five.

3. A method according to claim 1, wherein said digital television frames are of rectangular shape and formed with a plurality of frame lines symmetrically spread over a central frame line, said method further comprising quantizing in modules and direction said movement vectors of each preceding uneven frame, said quantizing being performed with respect to a two dimensional quantization grid over the whole of the dimension of the frame image, said quantization grid having a horizontal ph=1 and a vertical pv=2 quantization step, the movement vectors of the angles of said rectangular frame being excluded.

4. A method according to claim 3, wherein said quantizing is performed over a quantization grid comprising, in the vertical dimension, quantization thresholds of even value:

−6; −4; −2; 0; +2; +4; +6 the zero value of which corresponds to said central line of said image.

5. A method according to claim 3, wherein said quantizing is performed over a quantization grid comprising in the horizontal dimension quantization thresholds of even values:

−5; −3; −1; 0; +1; +3; +5.

6. A movement estimation system for high definition successive digital television frames, said frames being designated as successive preceding uneven frames and subsequent even frames and being subjected to HD-MAC type space-time sub-sampling processing, said successive frames each being formed of an even and an uneven field made of pixels blocks and movement being estimated for the even field of a current frame from an estimation of movement of the previous and subsequent adjacent uneven fields, N movement vectors being associated with the current pixels block of the even fields of one preceding uneven frame and a further movement vector being associated with a current pixels block of the even field of said subsequent even frame, by relative addressing said further movement vector being obtained with respect to n particular movement vectors of said preceding uneven frame defined by the pixels blocks adjacent the frame of the current pixels block, said system comprising:

means for classifying said n particular movement vectors by arranging said n particular movement vectors in a given sequence so as to establish a set of sequentially arranged vectors;

means for sorting said sequentially arranged vectors so as to suppress among said n particular movement vectors any redundant vector of order p, where p is a number less than n, with respect to the subset of the p−1 previous vectors, so as to provide a set of non-redundant particular movement vectors; and means for selecting the first s non-redundant particular movement vectors among the set of non-redundant particular movement vectors so as to establish a second reference base of specific vectors from which relative addressing of the current pixels block of the even field of said even frame is carried out.

7. A system according to claim 6, wherein said means for classifying said n particular movement vectors, said means for sorting the sequentially arranged vectors and said means for selecting the first s vectors comprise:

a high-speed computer for computing and managing the sequentially arranged vectors, the non-redundant particular movement vectors and the specific vectors forming said second reference base, and storage means for sequentially storing the sequentially arranged vectors, the non-redundant particular movement vectors and the specific vectors forming the second reference base.

8. A system according to claim 7, wherein said computer comprises, stored in a memory:

a program for classifying said n particular movement vectors, a program for sorting the sequentially arranged vectors by suppressing redundant vectors, and a program for selecting the first s non-redundant particular movement vectors.

* * * * *